United States Patent [19]
Molson

[11] Patent Number: 4,969,693
[45] Date of Patent: Nov. 13, 1990

[54] WHEEL COVER

[76] Inventor: William N. Molson, 3602 Mobile Court, Cleveland, Ohio 44109

[21] Appl. No.: 331,766

[22] Filed: Apr. 3, 1989

[51] Int. Cl.$^5$ .............................................. B60B 7/00
[52] U.S. Cl. .............................. 301/37 R; 301/37 SA
[58] Field of Search ............... 301/37 R, 37 SA, 37 P, 301/37 T, 108 R, 108 A; 40/587; 150/52 K; 118/505

[56] References Cited

U.S. PATENT DOCUMENTS

| | | |
|---|---|---|
| 1,167,124 | 1/1916 | Sloper . |
| 1,307,611 | 6/1919 | Blair . |
| 1,406,945 | 2/1922 | Kilborn et al. . |
| 1,846,266 | 2/1932 | Lyon . |
| 3,082,041 | 3/1961 | Hamilton ............................. 301/37 |
| 3,565,489 | 2/1971 | Eirinberg et al. ........... 301/37 SA X |
| 3,854,448 | 12/1974 | Kromanaker ....................... 118/505 |
| 3,883,180 | 5/1975 | Kain ............................ 301/108 A X |
| 3,987,409 | 10/1976 | Freeman ................... 301/37 SA X |
| 4,202,582 | 5/1980 | Seitman .................................. 301/37 |
| 4,712,838 | 12/1987 | Berg ............................... 301/37 SA |

FOREIGN PATENT DOCUMENTS 2096068 10/1982 U.S.S.R. ........................... 301/37 R

OTHER PUBLICATIONS

Paragraphs Q and R, and FIGS. Q and R, p. 58, Performance Bicycle Shop, Fall 1988, P. O. Box 2741, Chapel Hill, Noirth Carolina 27514.

Primary Examiner—Russell D. Stormer
Attorney, Agent, or Firm—Frederic B. Schramm

[57] ABSTRACT

A sheet cover for a bicycle wheel is provided consisting of two "half-moon" or approximately semi-circular sheets coated on one side with removable adhesive. The sheet material is stretched to reach beyond the rim of the bicycle wheel and adhered to the lateral surface of the rim by pressing the sheet against the rim. The wheel cover or sheet actually consists of two pieces which extend slightly beyond the center line so that they overlap. To avoid interference with the continued action of the brake shoes which are designed to press against the rim of the wheel for braking action, a box-like protector piece of drawn aluminum or other suitable material is fitted over the brake shoe which, being composed of a rubber-like material, would otherwise tend to tear the wheel cover. The half-moon pieces may be of different colors for decorative effect and may carry a printed advertising or identifying message.

3 Claims, 1 Drawing Sheet

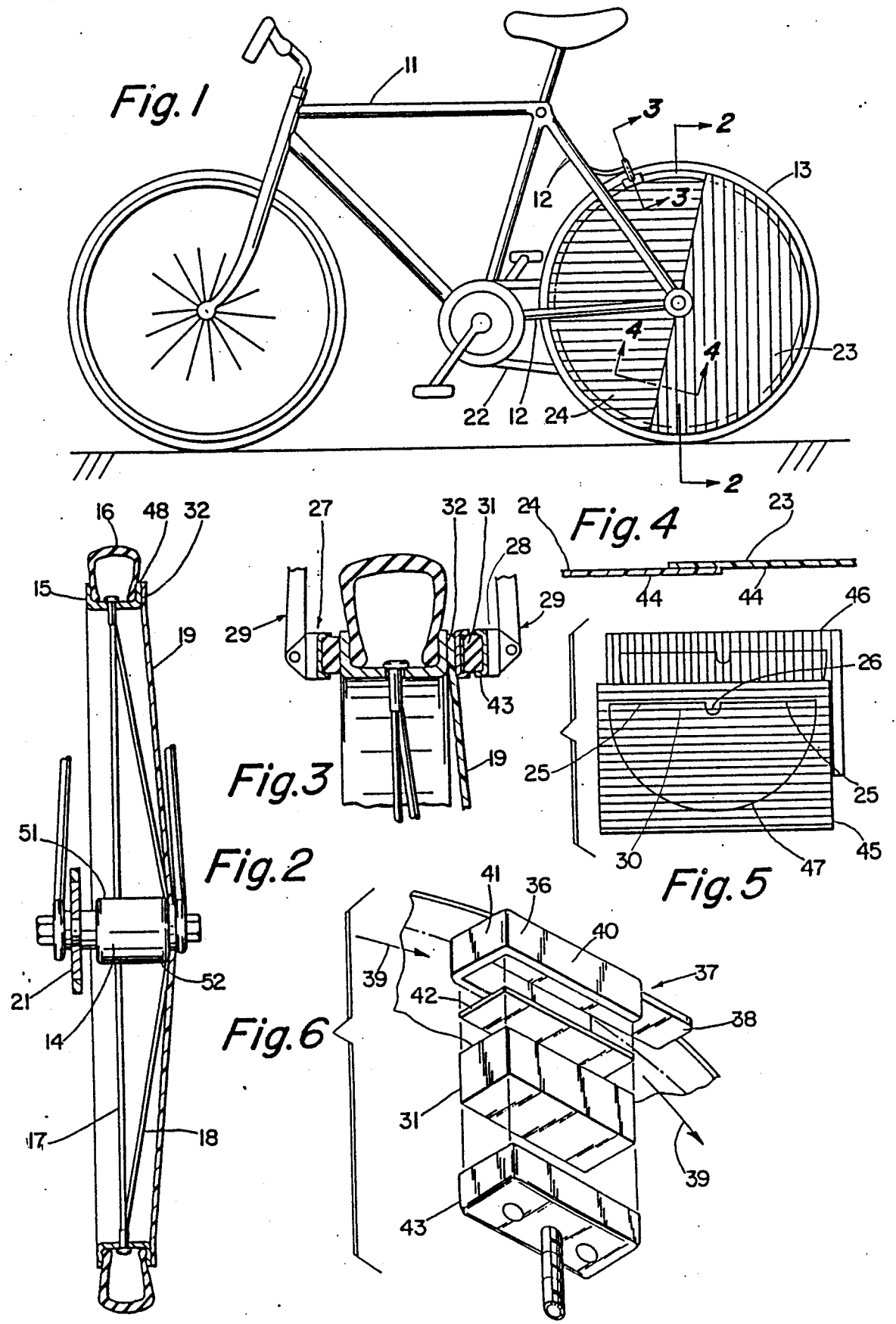

WHEEL COVER

BRIEF DESCRIPTION

In carrying out the invention in accordance with a preferred form thereof, a sheet cover for a bicycle wheel is provided which is in circular form and adhered to the lateral edges of a bicycle wheel rim. The wheel cover is designed to be placed against the spokes and the wheel rim on one side of the wheel, preferably away from the gears and the bicycle chain. Preferably the wheel sheet cover is in two or more parts so that it may be put in place without removing the wheel from the bicycle. The wheel cover may be printed with a message, such as the name of a bicycle rally in which bicyclists are participating or it may bear colors or designs for decorative effect. The cover is preferably composed of relatively inexpensive sheet material which may be discarded after it has served its purpose of identifying the paid participants in the bicycle rally.

In the preferred form, each sheet cover consists of a piece which is somewhat larger than a complete semicircle so that two approximately semicircular pieces may be inserted between the spokes of the wheel and the bicycle frame, overlapping slightly along their substantially radial edges so as to provide a closed sheet and an unbroken surface with respect to air friction.

DRAWINGS

A better understanding of the invention will be afforded by the following detailed description considered in conjunction with the accompanying drawing in which:

FIG. 1: Illustrates a bicycle used as an example with a wheel cover applied to one side of the rear wheel.

FIG. 2: Is a view in section of the rear wheel represented as cut by a plane 2—2 indicated in FIG. 1.

FIG. 3: Is an enlarged view in section of the portion of the wheel at which rear wheel brake shoes are mounted as indicated by plane 3—3 of FIG. 1.

FIG. 4: Is a cross sectional view of the wheel cover at the point of overlap of sheets represented as cut by a plane 4—4 indicated in FIG. 1.

FIG. 5: Is a diagram representing a manner of production of the substantially semicircular sheet pieces from rectangular stock and FIG. 6: Is an exploded perspective view illustrating the arrangement of the parts of the brake shoe assembly on the side of the wheel where the sheet cover is mounted.

DETAILED DESCRIPTION

A bicycle of the type illustrated in FIG. 1 comprises a conventional frame 11 with rear fork members 12 supporting a rear wheel 13. The wheel conventionally comprises a hub 14 supporting a rim 15 carrying a tire 16 which is shown as tubeless for simplicity in the drawing (although it will be understood that it may as well be a type of tire with an inner tube). Two set of spokes 17 and 18 extend substantially radially from the hub 14 to the rim 15.

In accordance with the invention, a wheel cover 19 is mounted on one side of the wheel 13, the side of the wheel away from a sprocket or gearing 21 and a drive chain 22. Consequently, it can readily be seen from the road on the traffic side of the bicycle to enhance bicycle safety.

In order that the sheet wheel cover 19 may be put in place without removing the wheel from the frame 11, the sheet wheel cover 19 is preferably formed in more than one piece. As shown in FIG. 5, each piece of the sheet wheel cover has an edge 47 which is an arc of a circle and two substantially straight edges 25. The straight edges overlap to form a substantially continuous circular sheet. The overlapping edges are preferably parallel so that the overlap is substantially uniform from center to circumference of the sheet cover. For greater speed and convenience in mounting, the sheet wheel cover 19 preferably consists of only two substantially semicircular or "half moon" pieces 23 and 24, each extending slightly beyond the diameter 30 from a true semicircular shape. Each piece is also formed with a semicircular notch 26 to fit around the hub 14 of the wheel. The angle subtended by arcuate length of the notch 26 slightly exceeds the angle subtended by arcuate length of the edge 47. The difference in subtended angle is sufficient to obtain uniform overlap. For decorative purposes, the sheets 23 and 24 may be of different colors, for example red and blue, which produces a variegated color effect depending upon the speed of the wheel as the bicyclist is travelling. The invention is not limited, however, to using sheets 23 and 24 of different colors and, if desired, they may be white or other colors with an advertising message and/or the name of the rally in which the bicyclist is participating printed thereon.

Modern bicycles are ordinarily equipped with clamp type wheel brakes for the front and rear wheels actuated by cables (not shown). In the case of the rear wheel, there may be two clamping brakes 27 and 28 supported and actuated by conventional (fragmentarily shown) lever linkage 29, each including a brake pad 31 adapted to press against the lateral surface 32 of the wheel rim 15. Such brake pads customarily comprise friction material such as a rubber-like material.

The skin cover 19 is composed of any suitable, relatively tough sheet material, such as flexible vinyl, capable of being stretched to position on the wheel against the rim 15 so as to be relatively smooth. Nevertheless, to guard against any tendency for the brake pad 31 to grab or tear the sheet material 19 when the brake 28 is applied, a brake-pad cover 36 is preferably interposed between the brake pad 31 and the portion of the wheel-cover sheet adhered to the lateral surface 32 of the wheel rim. The brake-pad cover 36 is in the form of a relatively light, open-ended box member composed of thin, relatively light material such as drawn aluminum with side walls 40 embracing corresponding sides of the brake pad 31. Such aluminum material is smooth and hard enough to avoid grabbing the sheet material of the wheel cover while providing adequate braking action. Thus the brake-pad cover is an important part of the combination.

As shown in FIG. 6, the brake-pad cover 36 has its bottom wall extended from the open end 37 along a tail portion 38. The brake-pad cover 36 is so positioned with respect to the wheel rotational direction indicated by the arrows 39 that the end wall 41 of the brake-pad cover 36 rests against the corresponding end of the brake pad and prevents the box-like brake-pad cover 36 from being forced out of position when the brakes 27 and 28 are applied. The side walls 40 of the brake-pad cover 36 prevent the brake-pad cover 36 from being skewed out of alignment by any twisting force which may take place when the brake pads are clamped against the rim of the rotating wheel.

As a precaution against the brake-pad cover 36 falling off when the brakes are in the "off" or retracted position, the brake-pad cover 36 is preferably adhered to the corresponding surface of the brake pad 31. For example as shown in FIG. 6, a two-faced sheet of adhesive material 42 may be interposed between the surface of the brake pad 31 and the bottom wall of the brake-pad cover 36. It will be understood that brake pads such as the brake pads 31 are normally permanently secured in a mounting 43 which is, in turn, suitably attached to the brake operating linkage 29.

The wheel cover pieces 23 and 24 consist of a suitable, relatively tough sheet product, such as flexible plastic sheets, coated on one side with adhesive substance so that when pressed against the lateral surface 32 of the wheel rim 15 they are held in place. Although permanent adhesive may be used for this purpose, preferably a well-known, temporary type of adhesive is employed on the coated side 44 of the sheet so that the sheet pieces 23 and 24 may readily be removed when desired without retaining a residue on the wheel rim 15. If desired, the coated sheet pieces 23 and 24 may be die cut from coated sheet material in the shape shown in FIG. 1. Preferably, as shown in FIG. 5, rectangular-shaped coated sheet material sheets 45 and 46 are employed as the starting material or stock. The stock rectangles 45 and 46 have sufficient length and breadth so that roughly semicircular wheel cover sheets may be formed for even the largest wheel in use. The stock 45, 46 is cut with a semicircular edge 47 slightly larger than the the maximum diameter which is likely to be required. One semicircular piece 23 may be placed toward the wheel spokes 18 and the lateral wheel rim surface 32, stretched radially outward so as to lie relatively flat, and the outer portion is placed against the rim surface 32. Then the second sheet 24 is inserted under the frame portion 12 and the sheet 24 is then applied to the wheel rim surface 32 in the same manner as was done with the piece 23. The peripheral portions of the sheet pieces 23 and 24 will extend beyond the wheel rim 32 and toward the tire 16, and the excess is readily trimmed away. For this purpose a suitable instrument is run along the circular edge 47 at the edge 48 of the wheel rim 15. Alternatively, if desired, the cutting instrument may be held in fixed position as the wheel is rotated. The instrument employed should be thin enough to be capable of severing wheel-sheet material but not so sharp to cut into the tire 16 if the operation is conducted hurriedly or carelessly. The tail end 38 of the brake-pad cover 36 serves admirably for this purpose, after which it is put in place over the brake pad 31. The element 36 thus forms a combination brake-pad cover and sheet trimmer.

In applying the wheel sheet cover, one half-moon piece 23 or 24 is removed from its backing or release paper and applied to the rear wheel. The half moon is contoured to the spoke curve which lies in a flat cone and stretched lightly. Then the other half moon is applied to the rear wheel making sure that the two overlaps are about equal. For example, approximately ¾" overlap has been found satisfactory.

After the half moons are properly aligned and contoured, the half moons are pressed together at the overlap. The one works around the rim pulling the material toward the rim before pressing firmly to the rim. Most of the wrinkles are thus removed without stretching too tightly.

Conventionally, the stock employed for the sheet pieces is produced with a backing sheet to cover the adhesive and the backing is discarded after the two layers have been peeled apart. What is known as a "kiss-cut" is used by the die cutter, in which the die penetrates just deeply enough to cut the roughly semicircular sheet pieces but not the backing.

In bicycles that are conventionally manufactured, the spokes 17 and 18 for the rear wheels are so arranged that the spokes 17 which extend from the end 51 of the hub 14 lie substantially along a plane, whereas the spokes 18 which extend from the end 52 of the hub 14 away from the chain 22 and gearing or sprocket 21 lie in a relatively flat cone. Since the spokes 17 are very nearly in a plane, they may have relatively little effect on the wind resistance if a bicycle is ridden at a high speed. Any wind resistance of the spokes 18 which lie in the flat cone is overcome by the presence of the sheet material 19 which covers the spokes 18. Thus some aerodynamic advantage may be obtained by the utilization of the skin sheets or wheel covers.

While the invention has been described as embodied in concrete form and operating in a specific manner in accordance with the provisions of the patent statutes, it should be understood that the invention is not limited thereto, since various modifications will suggest themselves to those skilled in the art without departing from the spirit of the invention.

What is claimed is:

1. A wheel cover consisting of two substantially semicircular pieces of flexible sheet material, each coated on one side with an adhesive substance, and each piece having a diameter, at least one piece extending slightly from its diameter so as to overlap the adjacent piece, thereby forming a circular one-piece cover, in combination with a wheel of the type employed in bicycles having a circular rim with a lateral circular surface, the portion of the cover near its circular circumference being pressed against the lateral rim surface, being thereby adhered thereto.

2. The wheel cover as described in claim 1 wherein the formed circular one piece cover has the shape of a flat cone.

3. A combination for use in forming bicycle wheel covers, which combination comprises sheet material having a flexible surface material coated with an adhesive substance and a backing lying against and covering the adhesive coated surface, the flexible surface material having an outline with a circular boundary portion and a substantially straight boundary portion, the circular boundary portion having a center, the straight boundary portion being displaced beyond the said center, whereby an area greater than a true semicircle is bounded and the coated flexible surface material is adapted to be joined to a similar piece to form a relatively flat cone.

* * * * *